(12) United States Patent
Xing et al.

(10) Patent No.: US 11,924,669 B2
(45) Date of Patent: *Mar. 5, 2024

(54) BANDWIDTH PART CONFIGURATION FOR NETWORK SLICING

(71) Applicant: T-Mobile USA, Inc., Bellevue, WA (US)

(72) Inventors: Shuqing Xing, Bellevue, WA (US); Mark L. Younge, Golden, CO (US); Scott Francis Migaldi, Cary, IL (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/161,533

(22) Filed: Jan. 30, 2023

(65) Prior Publication Data

US 2023/0180048 A1    Jun. 8, 2023

Related U.S. Application Data

(63) Continuation of application No. 17/096,799, filed on Nov. 12, 2020, now Pat. No. 11,570,652.
(Continued)

(51) Int. Cl.
*H04W 28/06*  (2009.01)
*H04W 28/02*  (2009.01)

(52) U.S. Cl.
CPC ....... *H04W 28/0231* (2013.01); *H04W 28/06* (2013.01)

(58) Field of Classification Search
CPC ............. H04L 41/5009; H04L 41/5067; H04L 43/0852; H04L 43/0888; H04W 48/188;
(Continued)

(56) References Cited

U.S. PATENT DOCUMENTS

2017/0079059 A1    3/2017  Li et al.
2017/0135099 A1    5/2017  Song et al.
(Continued)

FOREIGN PATENT DOCUMENTS

EP        2816858 A1     12/2014
WO    WO2017035300 A1    3/2017
(Continued)

OTHER PUBLICATIONS

3GPP, "Management and orchestration; Concepts, use cases and requirements", Technical Specification (TS) 28.530, 3rd Generation Partnership Project, Oct. 2018, 32 pages.
(Continued)

*Primary Examiner* — Syed Ali
(74) *Attorney, Agent, or Firm* — Lee & Hayes, P.C.

(57) ABSTRACT

A slice manager associated with a network access point of a telecommunication network can manage combinations of network slices and bandwidth parts for user equipment (UE). The bandwidth parts can have independently set numerologies, such as subcarrier spacing values. The UE can be configured to use one or more active bandwidth parts at a time, such that the slice manager can instruct the UE to use multiple active bandwidth parts simultaneously with respect to the same network slice or multiple network slices.

18 Claims, 7 Drawing Sheets

Related U.S. Application Data

(60) Provisional application No. 63/027,270, filed on May 19, 2020.

(58) Field of Classification Search
CPC . H04W 28/0231; H04W 24/02; H04W 28/06; H04W 72/0453
See application file for complete search history.

(56) References Cited

U.S. PATENT DOCUMENTS

| | | |
|---|---|---|
| 2017/0339688 A1 | 11/2017 | Singh et al. |
| 2018/0123878 A1 | 5/2018 | Li et al. |
| 2018/0183551 A1 | 6/2018 | Chou et al. |
| 2019/0246442 A1 | 8/2019 | Park et al. |
| 2019/0253917 A1 | 8/2019 | Dao |
| 2020/0044723 A1 | 2/2020 | Cirik et al. |
| 2020/0245233 A1 | 7/2020 | Qian et al. |
| 2020/0275484 A1* | 8/2020 | Xu ............... H04W 74/0808 |
| 2020/0322836 A1* | 10/2020 | Lekutai ........... H04W 28/0236 |
| 2021/0158151 A1 | 5/2021 | Wang |
| 2021/0160153 A1 | 5/2021 | Akman et al. |
| 2021/0298038 A1 | 9/2021 | Kang et al. |
| 2021/0345300 A1 | 11/2021 | Selvanesan et al. |
| 2021/0368379 A1 | 11/2021 | Xing et al. |
| 2021/0368514 A1 | 11/2021 | Xing |
| 2022/0070104 A1 | 3/2022 | Luo et al. |
| 2022/0078663 A1 | 3/2022 | Luo et al. |
| 2022/0078857 A1 | 3/2022 | Kim |
| 2022/0131582 A1 | 4/2022 | Park et al. |
| 2022/0167408 A1 | 5/2022 | Lee et al. |
| 2022/0174766 A1 | 6/2022 | Zhou et al. |
| 2022/0201556 A1 | 6/2022 | Yang et al. |
| 2022/0225292 A1 | 7/2022 | Mohammad Soleymani et al. |
| 2023/0020284 A1* | 1/2023 | Soldati .............. H04L 5/0091 |
| 2023/0199793 A1* | 6/2023 | Muruganathan ...... H04L 5/0053 370/329 |
| 2023/0309080 A1* | 9/2023 | Cirik .............. H04W 72/046 375/267 |
| 2023/0337014 A1* | 10/2023 | Zhou ................. H04W 16/28 370/329 |

FOREIGN PATENT DOCUMENTS

| | | |
|---|---|---|
| WO | WO2017074486 A1 | 5/2017 |
| WO | WO2017097227 A1 | 6/2017 |
| WO | WO2017172789 A1 | 10/2017 |
| WO | WO2017177364 A1 | 10/2017 |
| WO | WO2018121621 A1 | 7/2018 |
| WO | WO2019152213 A1 | 8/2019 |

OTHER PUBLICATIONS

3GPP, "NR: Physical channels and modulation", Technical Specification (TS) 38.211, 3rd Generation Partnership Project, Mar. 2019, 98 pages.

3GPP, "NR; NR and NG-RAN Overall description; Stage-2", Technical Specification (TS) 38.300, 3rd Generation Partnership Project, Jul. 2020, 150 pages.

3GPP, "NR; Physical layer procedures for data", Technical Specification (TS) 38.214, 3rd Generation Partnership Project, Jul. 2019, 95 pages.

3GPP, "NR; Physical layer procedures for control", Technical Specification (TS) 38.213, 3rd Generation Partnership Project, Jul. 2019, 110 pages.

3GPP, "Procedures for the 5G System", Technical Specification (TS) 28.502, 3rd Generation Partnership Project, Jun. 2018, 311 pages.

3GPP, "System architecture for the 5G System (5GS)", Technical Specification (TS) 23.501, 3rd Generation Partnership Project, Apr. 2019, 242 pages.

3GPP, "Technical Specification Group Services and System Aspects; Release 15 Description; Summary of Rel-15 Work Items (Release 15)", vol. TSG SA, No. V0.6.0, Feb. 4, 2019, pp. 1-122.

Extended European Search Report dated Oct. 29, 2021 for European Patent Application No. 21173816.6. 12 pages.

Office Action for U.S. Appl. No. 17/324,013, dated Sep. 15, 2022, Shuqing Xing, "Base Station Management of End-to-End Network Latency", 19 pages.

Office Action for U.S. Appl. No. 17/096,836, dated Oct. 4, 2022, Shuqing Xing, "Base Station Radio Resource Management for Network Slices", 23 pages.

Office Action for U.S. Appl. No. 17/096,799, dated Mar. 16, 2022, Xing, "Bandwidth Part Configuration for Network Slicing", 27 pages.

Office Action for U.S. Appl. No. 17/096,836, dated Apr. 20, 2022, Xing, "Base Station Radio Resource Management for Network Slices" 24 pages.

S2-189055, "New key issue and solution for the enhancement of PDB provision", 3GPP, Aug. 24, 2018.

* cited by examiner

BANDWIDTH PART CONFIGURATION FOR NETWORK SLICING

CROSS-REFERENCE TO RELATED APPLICATIONS

This application is a continuation of and claims priority to U.S. application Ser. No. 17/096,799, filed on Nov. 12, 2020 and entitled "BANDWIDTH PART CONFIGURATION FOR NETWORK SLICING," which is a non-provisional of and claims priority to U.S. Provisional Patent Application No. 63/027,270, entitled "BANDWIDTH PART SELECTION FOR NETWORK SLICING," filed on May 19, 2020, which are incorporated by reference herein in their entirety.

BACKGROUND

Network slicing can be used to create different virtual networks within a telecommunication network. For example, network resources can be allocated among different network slices. Each network slice can thus be used as an independent virtual network, because each network slice may be associated with different network resources.

Some telecommunication networks, such as fifth generation (5G) telecommunication networks, may also permit bandwidth to be subdivided into bandwidth parts. The bandwidth parts may have different numerologies, such as different subcarrier spacing values.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figures 1, 2:
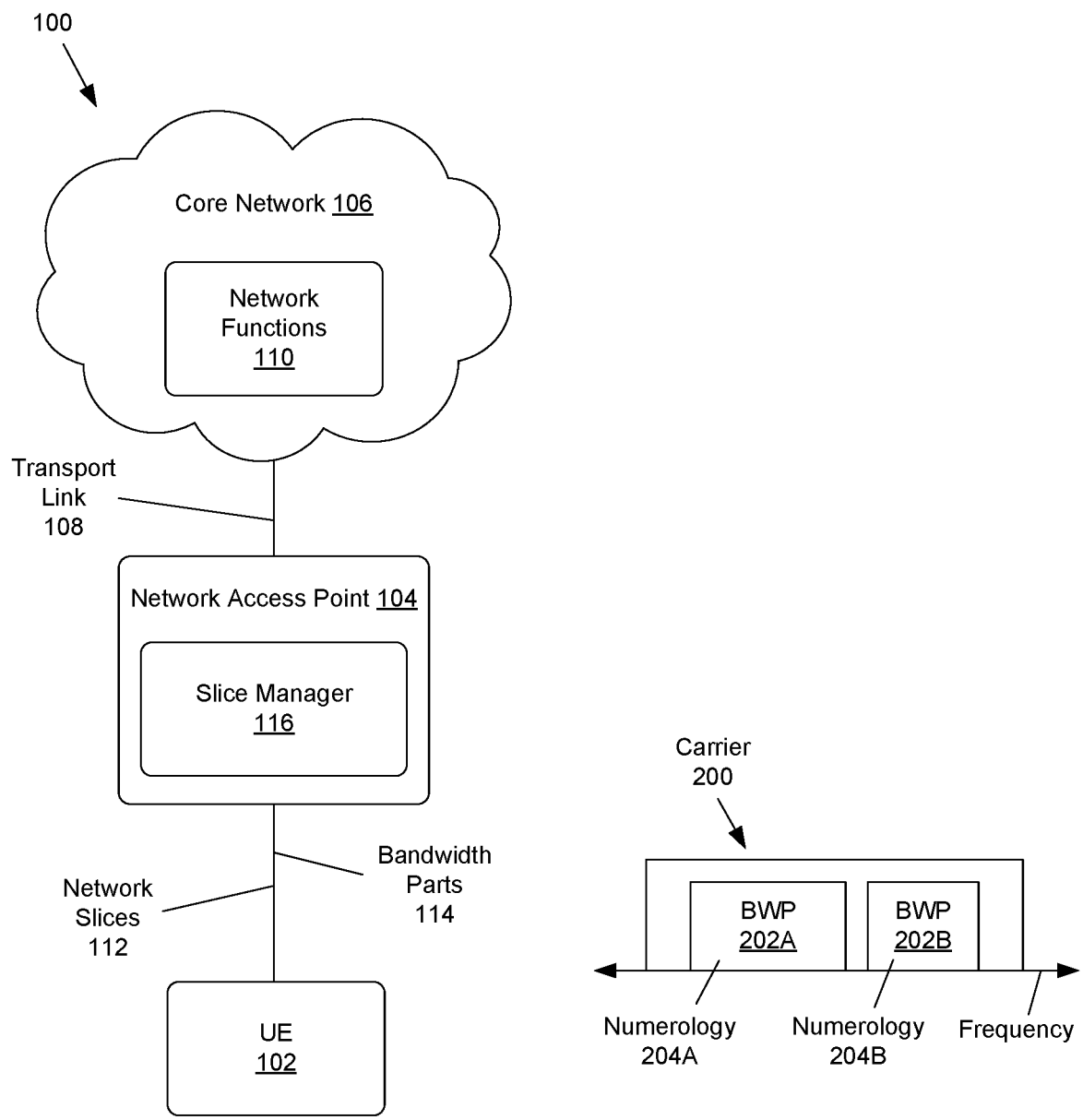
FIG. 1 shows an example network environment in which user equipment can connect to a telecommunication network via combinations of network slices and bandwidth parts.
FIG. 2 shows an example of a carrier that includes multiple bandwidth parts.

Network access points of a telecommunication network may support transmissions at frequencies in one or more spectrum bands. For example, a base station or other network access point may support low band frequencies, mid-band frequencies, and/or high band frequencies. Portions of such spectrum bands can be divided in various ways within the telecommunication network, for example using network slicing and/or bandwidth parts.

Network slicing allows multiple network slices to be created on a shared physical infrastructure. Each network slice can operate as an independent virtual end-to-end network. Different network resources can be allocated to each network slice. For example, different portions of spectrum supported by a network access point can be allocated to different network slices. Accordingly, network slices that use different network resources may be effectively isolated from one another, such that issues with one network slice may be unlikely to impact another network slice.

In some cases, different network slices may be associated with different use cases, services, or applications. For instance, a fifth generation (5G) core network may create different network slices for Enhanced Mobile Broadband (eMBB) applications, Massive Internet of Things (MIoT) applications, Ultra-Reliable Low Latency Communication (URLLC) applications, vehicle-to-everything (V2X) applications, and/or other types of applications.

Portions of spectrum can also be divided into different bandwidth parts. For example, different bandwidth parts can include different subsets of physical resource blocks of a spectrum band. Different bandwidth parts may have different numerologies. For example, different bandwidth parts within the same spectrum band may have different subcarrier spacing values. Different subcarrier spacing values may have different benefits associated with latency, throughput, and reliability.

Some telecommunication networks may allow a user equipment (UE) to be served by multiple network slices simultaneously. For example, a UE may be able to use a first network slice for an eMBB service and also use a second network slice for a URLLC service. However, existing telecommunication network standards may limit the UE to using a single active bandwidth part at a time. For instance, some telecommunication networks restrict UEs to using one bandwidth part for upstream communications and/or one bandwidth part for downstream communications. The UE may be able to switch between different bandwidth parts at different times in such communication networks, but the UE may be limited to using one active bandwidth part at a time.

Accordingly, even if different bandwidth parts have numerologies that may help meet latency or throughput goals associated with different services and/or different network slices, the UE may be prevented from using more than one active bandwidth part at a time. Existing solutions may thus restrict how telecommunication networks and UEs can use bandwidth parts in combination with network slices.

The systems and methods described herein can allow a telecommunication network to select and/or reserve one or more bandwidth parts for use with one or more network slices. As described herein, a UE can be configured to use one or more active bandwidth parts at a time. Accordingly, based on a configuration of bandwidth parts and network slices by the telecommunication network, in some situations the UE can use multiple active bandwidth parts simultaneously with respect to one or more network slices. Various combinations of one or more bandwidth parts and one or more network slices can thus be used in different use cases, as described herein.

FIG. 1 shows an example network environment 100 in which a UE 102 can connect to a telecommunication network to engage in communication sessions for voice calls, video calls, messaging, data transfers, and/or any other type of communication. The UE 102 can be any device that can connect to the telecommunication network. In some examples, the UE 102 can be a mobile phone, such as a smart phone or other phone. In other examples, the UE 102 can be a personal digital assistant (PDA), a media player, a tablet computer, a gaming device, a smart watch, a hotspot, a set top box, a streaming media player, a personal computer (PC) such as a laptop, desktop, or workstation, or any other type of computing or communication device.

The telecommunication network can include, or be associated with, a network access point 104. The UE 102 can connect to the network access point 104 to receive data from the telecommunication network and/or send data to the telecommunication network. In some examples, the UE 102 can establish a wireless connection with the network access point 104. In other examples, the UE 102 can connect to the network access point 104 using a wired connection, such as via an Ethernet cable or other twisted pair cable or wire, via a fiber optic connection, or via any other type of wired connection.

In some examples, the network access point 104 can be part of an access network associated with the telecommunication network. As a non-limiting example, the network access point 104 can be a base station in a radio access network (RAN) that includes other base stations and/or other network access points to which the UE 102 can connect. In other examples, the network access point 104 can be a WiFi® router or access point, a wired access point, or another type of network access point.

In some examples, the telecommunication network can also have a core network 106 linked to the network access point 104 and/or other elements of an access network. For example, a transport link 108 can connect the network access point 104 to one or more elements of the core network 106. The transport link 108 can include fiber optic connections, microwave connections, and/or other type of backhaul data connection that connects the network access point 104 to the core network 106 directly or via one or more intermediate network elements. Overall, the UE 102 can connect to the network access point 104, and in turn be connected to the core network 106 via the network access point 104 and the transport link 108. The core network 106 may also link the UE 102 to an Internet Protocol (IP) Multimedia Subsystem (IMS), the Internet, and/or other networks.

The UE 102, the network access point 104, the access network, and/or the core network 106 can be compatible with one or more access technologies, protocols, and/or standards. For example, the UE 102, the network access point 104, and/or the core network 106 can support fifth generation (5G) New Radio (NR) technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology. In some examples, the UE 102 and the network access point 104 may also, or alternately, support wired broadband access technologies or other wired access technologies, such as cable, twisted pair, or other wide area network (WAN) and/or local area network (LAN) technologies.

In some examples, the access network can be a 5G access network, and the network access point 104 can be a 5G base station known as a gNB. The core network 106 can, in some examples, also be based on 5G technologies. For instance, the core network 106 can be a 5G core (5GC) network. In other examples, the network access point 104 and/or the core network 106 can be use or be compatible with LTE or other broadband access technologies. For instance, the core network 106 can be an LTE packet core network known as an Evolved Packet Core (EPC), a 5GC, or a combination of both an EPC and a 5GC, and may communicate with gNBs and/or LTE base stations known as eNBs. As another example, the access network can be a cable broadband distribution network, and the network access point 104 can be a cable head end connected to the core network 106.

The telecommunication network may, in some examples, have a service-based system architecture in which different types of network functions 110 operate alone and/or together to implement services. As a non-limiting example, a 5G network can include network functions 110 such as an Authentication Server Function (AUSF), Access and Mobility Management Function (AMF), Network Slice Selection Function (NSSF), Policy Control Function (PCF), Session Management Function (SMF), Unified Data Management (UDM), Unified Data Repository (UDR), User Plane Function (UPF), Application Function (AF), and/or other network functions 110. In some examples, the network functions 110 can also, or alternately, include one or more of a communication service management function (CSMF), a network slice management function (NSMF), and a network slice subnet management function (NSSMF), as discussed in more detail below with respect to FIG. 5.

Some network functions 110 may execute in the core network 106. For example, the core network 106 can include one or more instances of an AMF, an SMF, a UPF, an AUSF, a PCF, a UDM, an NSSF, and/or other network functions 110. In some examples, some network functions 110 may also, or alternately, execute at edge computing elements positioned between the network access point 104 and the core network 106. In some examples, the UE 102 and/or the access network, including the network access point 104, may also be considered to be network functions 110 of the telecommunication network. Network functions 110 may be implemented using dedicated hardware, as software on dedicated hardware, or as virtualized functions on servers, cloud computing devices, or other computing devices.

The network access point 104 and the UE 102 may support data transmissions at frequencies in one or more spectrum bands, such as low band frequencies under 1 GHz, mid-band frequencies between 1 GHz and 6 GHz, and/or high band frequencies above 6 GHz, including millimeter wave (mmW) frequencies above 24 GHz. As an example, a gNB may be configured to support one or more of the bands shown below in Table 1, and/or one or additional bands that are not listed here.

TABLE 1

Example Bands in 5G NR Spectrum

| Band | Shorthand Frequency (MHz) | Uplink Band (MHz) | Downlink Band (MHz) |
|---|---|---|---|
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |
| n71 (Low Band) | 600 | 663-698 | 617-652 |
| n260 (mmW) | 39000 (39 GHz) | 37000-40000 | 37000-40000 |
| n261 (mmW) | 28000 (28 GHz) | 27500-28350 | 27500-28350 |

Different spectrum bands may have different attributes, cover different licensed and/or franchised areas, use different access technologies, and/or vary in other ways. For example, in some situations, low bands may use radio access technologies to cover the largest geographical areas. As another example, low bands may be used in other situations with metallic access technologies to serve LANs or WANs. In some situations, mid-bands may cover smaller geographical areas than low bands. Additionally, in some cases, mmW bands and other high bands and/or wavelengths may cover smaller geographical areas than low bands and/or mid-bands with radio access technologies, and/or be used in WANs and LANs with optical access technologies.

Additionally, different frequencies may be associated with different metrics, such as latency, throughput, reliability, supported bandwidths, and/or other metrics. For example, in some situations mmW bands may be capable of providing higher throughput and/or lower latencies than mid-bands or low bands. As another example, low band frequencies may propagate farther and/or have better penetration than higher frequencies, such that low bands can be more accessible than mid-bands or high bands in some cases.

The telecommunication network can include one or more network slices 112. Each network slice 112 can be a virtual and independent end-to-end logical network within the overall telecommunication network. End-to-end network slicing can create different network slices 112 by allocating resources of the core network 106, the transport link 108, and/or the access network to different network slices 112. End-to-end network slicing can thus include one or more of core network slicing, transport slicing, and access network slicing.

A full end-to-end network slice 112 can be referred to as a Network Slice Instance (NSI). An NSI can include subgroups of managed functions and resources associated with the core network 106, the transport link 108, and/or the access network. Each subgroup of a full NSI can be referred to as a Network Slice Subnet Instance (NSSI). For example, a full NSI can include an NSSI in the core network 106 and another NSSI in the access network. In some examples, the network slices 112 shown in FIG. 1 can be access network portions of end-to-end network slices 112, such as access network NSSIs within NSIs that also extend through the transport link 108 and core network 106. In other examples, the network slices 112 shown in FIG. 1 can be full end-to-end network slices 112, such as NSIs that include access network NSSIs.

Network slicing can allow hardware resources, computing resources, access network resources, and/or other resources of the core network 106, transport link 108, and/or access network to be shared among different network slices 112. For example, shared and/or different resources of hardware, transport links 108, and/or other network elements can be allocated to different network slices 112. Accordingly, relative to having distinct hardware, transport links 108, and/or other network elements for different end-to-end networks, operational and capital expenses can be reduced due to implementing different virtual networks via different network slices 112 on shared hardware, transport links 108, and/or other network elements.

In some examples, different network slices 112 may be associated with shared network functions 110, and/or different network functions 110, at the core network 106 and/or at edge computing elements. For instance, different network slices may be associated with a shared AMF and a shared NSSF, but be associated with different SMF, UPF, and PCF instances.

In some examples, elements of the core network 106 may initially create network slices 112. A particular network slice 112 may be associated with a Service Level Agreement (SLA), Quality of Service (QoS) level, or other service-based requirements or goals. For instance, an SLA for a network slice 112 may define types of services to be associated with the network slice 112, target latency measurements for the network slice 112, target throughput measurements for the network slice 112, reliability goals for the network slice 112, and/or other attributes of the network slice 112. As an example, an SLA may indicate a maximum latency value, a minimum throughput value, a target maximum drop call rate or other reliability goal, and/or other goals. Accordingly, in some examples the core network 106 may at least initially create or design an end-to-end network slice 112 with coordinated portions in the core network 106, the transport link 108, and the access network that are expected by the core network 106 to provide or meet the goals for the network slice 112. An SLA or other information may also indicate a specified location for a network slice 112. For example, an SLA may indicate that a network slice 112 with particular attributes should be provided in a certain city or neighborhood. Accordingly, the core network 106 may cause a corresponding network slice 112 to be created in part via at least one network access point in the specified location.

As a non-limiting example, an SLA for a particular network slice 112 may indicate that the network slice 112 is intended for eMBB services. Because eMBB services may often involve relatively large data transmissions, but be delay-tolerant, the SLA may indicate a relatively high throughput goal for the network slice 112, and also allow relatively high latencies on the network slice 112. However, in this example, a second SLA for a second network slice 112 may indicate that the second network slice 112 is intended for URLLC services. URLLC services may prioritize low latency measurements and high reliability, and accordingly the second SLA may indicate a relatively low latency goal and a relatively high reliability goal for the second network slice 112.

Each network slice 112 can be identified using Single Network Slice Selection Assistance Information (S-NSSAI). The S-NSSAI of a network slice 112 may indicate a Slice/Service Type (SST) of the network slice 112. As an example, the SST of a network slice 112 may indicate that the network slice 112 is intended for eMBB services, URLLC services, or MIoT services. In some examples, the S-NSSAI may also indicate a Slice Differentiator (SD). For example, if the telecommunication network includes multiple network slices 112 with an "eMBB" SST, each of those multiple eMBB network slices 112 may be distinguished using a different SD value, such that each network slice 112 has a different S-NSSAI overall.

In some examples, different network slices 112 may be created for different types or groups of users, such as users associated with different customers, different subscriber levels or tiers, or other categories. As an example, UEs 102 associated with a particular company may be directed to use an eMBB network slice 112 created for that company's users, while other UEs 102 may be directed to use one or more other eMBB network slices 112 created for general eMBB traffic or for other groups of users. Although each network slice 112 in this example may be intended for eMBB services, the different network slices 112 may be associated with different SLAs with different throughput goals or other different attributes.

The UE 102 may be served by one or more network slices 112 associated with the network access point 104. As a non-limiting example, in some cases the telecommunication network may provide a first network slice 112 for eMBB services, and a second network slice 112 for URLLC services. In this example, if the UE 102 is using an URLLC service and an eMBB service simultaneously, the UE 102 may be served by both the first network slice 112 and the second network slice 112 simultaneously via the network access point 104.

In some examples, elements of the core network 106 may initially select one or more network slices 112 for the UE 102. For example, when the UE 102 registers with the telecommunication network or sends a service request to the core network 106, an AMF may retrieve subscriber profile information associated with the UE 102. The subscriber profile information may indicate S-NSSAIs of network slices 112 that the UE 102 is permitted to access. The AMF may coordinate with an NSSF to select or more specific network slices 112 for the UE 102 based on the network registration or service request, and based on which S-NSSAIs are permissible for the UE 102.

In some examples, different portions of available resources can be allocated to different network slices 112 in the access network. For instance, the network access point 104 can be configured to use different frequency bands, or different portions of one or more frequency bands, for different network slices 112. Accordingly, although the network access point 104 may be associated with multiple network slices 112, each of the network slices 112 may be associated with different ranges of frequencies supported by the network access point 104. Accordingly, different network slices 112 can operate as independent virtual networks at least in part because each network slice 112 uses isolated and distinct resources of the network access point 104.

Resources of the access network can also be divided into different bandwidth parts 114. For example, different subsets of physical resource blocks associated with spectrum supported by the network access point 104 can be allocated to different bandwidth parts 114 of an allocated channel bandwidth (CBW). Bandwidth parts 114 can also be referred to as "BWPs." Bandwidth parts 114 are discussed in more detail below with respect to FIGS. 2-4.

Spectrum supported by the network access point 104 can thus be allocated to different network slices 112 and also be allocated to different bandwidth parts 114 that may align with the network slices 112. In some examples, multiple bandwidth parts 114 can support multiple network slices 112. For instance, individual network slices 112 may be associated with different bandwidth parts 114. In other examples, multiple bandwidth parts 114 can support a single network slice 112. In still other examples, a single bandwidth part 114 can support or share multiple network slices 112.

The UE 102 can be configured to support one or more active bandwidth parts 114 at a time in a CBW. As an example, in situations in which multiple bandwidth parts 114 support multiple network slices 112, the UE 102 may simultaneously use two or more bandwidth parts 114 that are associated with two or more different network slices 112 when downloading data. As another example, the UE 102 may simultaneously use two or more bandwidth parts 114 that are associated with one particular network slice 112 when downloading data. The use of one or more bandwidth parts 114 in combination with one or more network slices 112 is discussed in more detail below with respect to FIGS. 6-8.

The network access point 104 can have a slice manager 116 configured to locally manage and adjust network slices 112 associated with the network access point 104, and/or bandwidth parts 114 associated with those network slices 112. For example, the slice manager 116 can determine which portions of spectrum to allocate to different network slices 112, and which portions of spectrum to allocate to different bandwidth parts 114. The slice manager 116 can thus determine how one or more network slices 112 relate to one or more bandwidth parts 114, for instance by aligning with one or more network slices 112 with one or more bandwidth parts 114, as will be discussed further below. As another example, the slice manager 116 can determine numerologies associated with individual bandwidth parts 114 associated with one or more network slices 112, as will be discussed further below. In other examples, the slice manager 116 can be located at another node of the access network, at an edge computing element, or in the core network 106.

FIG. 2 shows an example of a carrier 200 that includes multiple bandwidth parts 114, including a first bandwidth part 202A and a second bandwidth part 202B. The carrier 200 can have a bandwidth that spans a portion of spectrum supported by the network access point 104. In some 5G NR examples, the carrier 200 may have a bandwidth of up to 100 MHz in low bands and mid-bands, or have a bandwidth of up to 400 MHz in mmW bands and other high bands. The carrier 200 can include a set of physical resource blocks, which can be subdivided into different bandwidth parts 114. For example, different bandwidth parts 114 within a carrier 200, such as the first bandwidth part 202A and the second bandwidth part 202B, can be associated with different sets of contiguous physical resource blocks of the carrier 200.

Each bandwidth part 114 may have an associated numerology 204. Different bandwidth parts 114 may have the same or different numerologies 204. For example, the first bandwidth part 202A can have a first numerology 204A, and the second bandwidth part 202B can have a second numerology 204B. The numerology of each bandwidth part 114 can be set independently, such that the first numerology 204A for the first bandwidth part 202A may be the same or different from the second numerology 204B for the second bandwidth part 202B.

The numerology 204 of a bandwidth part 114 can indicate a particular subcarrier spacing value, a cyclic prefix (CP) type, and/or other attributes of a waveform associated with the bandwidth part 114. For example, the first numerology 204A may indicate that a first subcarrier spacing value is used for the first bandwidth part 202A, while the second numerology 204B may indicate that a second subcarrier spacing value is used for the second bandwidth part 202B.

Figure 3:
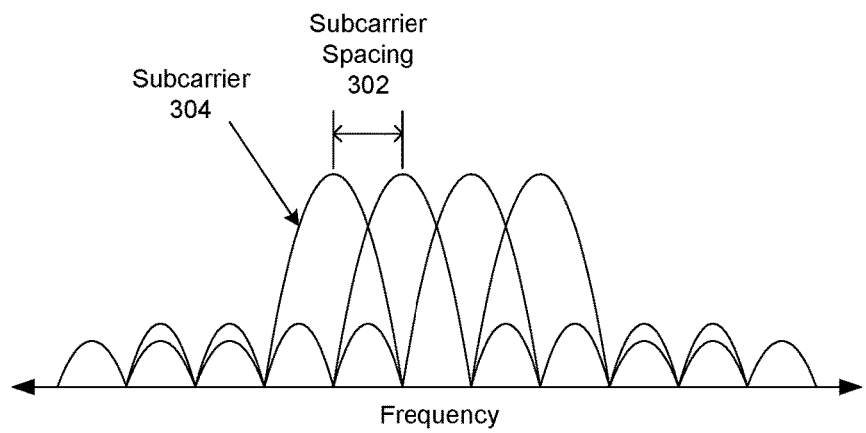
FIG. 3 shows a first example of subcarrier spacing between subcarriers.
Figure 4:
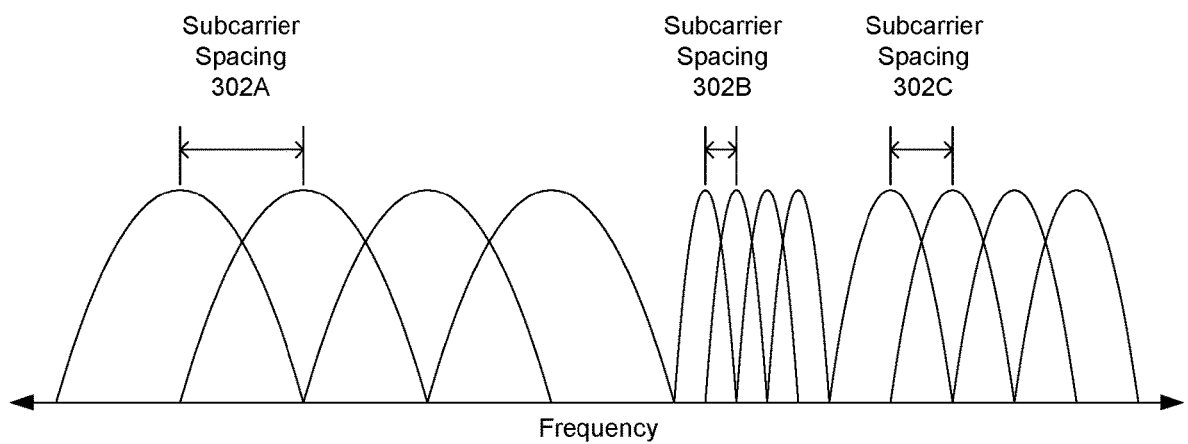
FIG. 4 shows a second example of subcarrier spacing between subcarriers.

As an example, FIGS. 3 and 4 show example subcarrier spacings 302 in orthogonal frequency-division multiplexing (OFDM) waveforms, which may correspond to numerologies 204 of bandwidth parts 114. The network access point 104 may, at a physical layer, use an OFDM waveform, to combine and transport multiple signals over the channel bandwidth of the carrier 200. In OFDM, data streams can be encoded into OFDM symbols in part based on operations such as an Inverse Fast Fourier Transform (IFFT). The UE 102 can perform an operation, such as a Fast Fourier Transform, on received OFDM symbols to recover an original data stream. Similar operations can be used for transmissions from the UE 102 to the network access point 104.

OFDM symbols for different data streams can be transmitted in parallel using different subcarriers 304. Each resource block of the carrier 200 may include multiple subcarriers 304, and accordingly each bandwidth part 114 can also include multiple subcarriers 304. The subcarriers 304 can be spread out over the overall bandwidth of the carrier 200 according to subcarrier spacing 302 that causes individual subcarriers 304 to be orthogonal in the frequency domain. For example, as shown in FIG. 3, subcarrier spacing 302 can be chosen such that peaks of individual subcarriers 304 are positioned at frequencies where other subcarriers 304 have nulls. This orthogonality can mitigate interference between the subcarriers 304.

In some cases, because multipath propagation can cause a loss of orthogonality between subcarriers 304, portions of the ends of the OFDM symbols can be added to the beginning of the OFDM symbols as CPs. The CPs can serve as guard intervals that space out the OFDM symbols, and/or can help a receiver distinguish between the OFDM symbols. In some examples, normal or extended CP types can be used in different situations or with certain subcarrier spacing 302 values, as will be discussed further below.

The subcarrier spacing 302 can be inversely proportional to the length of the OFDM symbols, such that larger subcarrier spacing 302 values can be associated with shorter OFDM symbols, while shorter subcarrier spacing 302 values can be associated with longer OFDM symbols. In some cases, the length of CPs can similarly scale depending on the subcarrier spacing 302 in order to maintain a ratio of the length of the CPs to the overall length of the OFDM symbols.

In LTE, the subcarrier spacing 302 may be fixed at 15 kHz. However, in 5G NR and some other broadband access technologies, the subcarrier spacing 302 is scalable, such that the subcarrier spacing 302 can be changed and/or set at different values. This can allow the subcarrier spacing 302 to vary between different subcarriers 304 in 5G NR transmissions, as shown in the example of FIG. 4. Accordingly, when different subcarriers 304 with different subcarrier spacing 302 are associated with different bandwidth parts 114, the different bandwidth parts 114 can have different numerologies 204.

In some examples, values for 5G NR subcarrier spacing 302 can be determined by the equation $2^{\mu} \cdot 15$ kHz, where $\mu$ is a non-negative integer. Such values include 15 kHz, 30 kHz, 60 kHz, 120 kHz, and 240 kHz. Different numerologies 204 may be referred to using different values for $\mu$ in the equation $2^{\mu} \cdot 15$ kHz, because different values for $\mu$ can define different subcarrier spacing 302 values.

In some examples, different subcarrier spacing 302 values can be allowed for subcarriers based on a spectrum band associated with the subcarriers. For example, in some cases the subcarrier spacing 302 in low bands can be set at 15 kHz, 30 kHz, or 60 kHz, the subcarrier spacing 302 in mid-bands can be set at 30 kHz or 60 kHz, and the subcarrier spacing 302 in high bands can be set at 60 kHz or 120 kHz.

Because different subcarrier spacing 302 values can be associated with OFDM symbols of different lengths, different numbers of OFDM symbols can be sent during the same period of time when different OFDM numerologies are used. For example, data can be scheduled to be sent within subframes of 1 ms each, with ten subframes fitting into a 10 ms radio frame. Depending on the subcarrier spacing 302, such subframe can have a different number of slots for OFDM symbols. When different numerologies 204 are used, the different numerologies 204 can align on OFDM symbol boundaries in the time domain, such as every 1 ms between subframes.

The number of OFDM symbols that can fit into each slot can vary according to a CP type. In some examples, a normal CP type can allow 14 OFDM symbols to fit into each slot, while an extended CP type can allow 12 OFDM symbols to fit into each slot. In some examples, a normal CP can be used with subcarrier spacing 302 values of 5 kHz, 30 kHz, 60 kHz, 120 kHz, and 240 kHz, while an extended CP can also be used with a 60 kHz subcarrier spacing 302. Table 2, shown below, shows a non-limiting example of attributes of different numerologies 204 associated with different subcarrier spacing 302 values and CP types, which can vary the number of slots per subframe and thus the total number of OFDM symbols that can be sent per subframe.

TABLE 2

Attributes of Different Numeralogies

| μ | Subcarrier Spacing and CP Type | Number of OFDM Symbols per Slot | Number of Slots per 1 ms Subframe | Number of OFDM Symbols per 1 ms Subframe |
|---|---|---|---|---|
| 0 | 15 kHz (Normal CP) | 14 | 1 | 14 |
| 1 | 30 kHz (Normal CP) | 14 | 2 | 28 |
| 2 | 60 kHz (Normal CP) | 14 | 4 | 56 |
| 2 | 60 kHz (Extended CP) | 12 | 4 | 48 |
| 3 | 120 kHz (Normal CP) | 14 | 8 | 112 |
| 4 | 240 kHz (Normal CP) | 14 | 16 | 224 |

In some cases, a smaller subcarrier spacing 302 value can be desired because the associated OFDM symbols are larger, even though fewer OFDM symbols can be transmitted during a given period of time. For example, because larger OFDM symbols include larger CPs copied from the ends of OFDM symbols, a smaller subcarrier spacing 302 value might be used when copies of the data at the ends of OFDM symbols may be needed to reliably decode the OFDM symbols. On the other hand, in some cases a larger subcarrier spacing 302 value can be desired because the associated OFDM symbols are smaller and can be transmitted more frequently. Accordingly, in some examples a larger subcarrier spacing 302 value may result in lower latencies relative to smaller subcarrier spacing 302 values.

As discussed above, a slice manager 116 can manage network slices 112 and associated bandwidth parts 114 at a network access point 104. One or more bandwidth parts 114 may be associated with one or more network slices 112. Accordingly, the slice manager 116 may determine or adjust numerologies 204 associated with different bandwidth parts 114 and/or network slices 112. For example, the slice manager 116 may determine values for subcarrier spacing 302 of each bandwidth part 114, a CP type for each bandwidth part 114, and/or other attributes of the numerology 204 for each distinct bandwidth part 114.

In some examples, the slice manager 116 may select numerologies 204 for bandwidth parts at a layer of a protocol stack, such as at a Media Access Control (MAC) layer, and cause the network access point 104 to implement the selected numerologies 204 at a physical layer of the protocol stack. Additionally, in some examples, the slice manager 116 can cause the network access point 104 to send the UE 102 indications of the selected numerologies 204 for one or more bandwidth parts. For example, the network access point 104 can send a Radio Resource Control (RRC) message to the UE 102 that identifies the selected numerologies 204 for one or more bandwidth parts. In some examples, the same RRC message, a different RRC message, or a different type of message sent by the network access point 104 may also instruct the UE 102 to use one or more specific network slices 112 and/or bandwidth parts 114.

Figure 5:
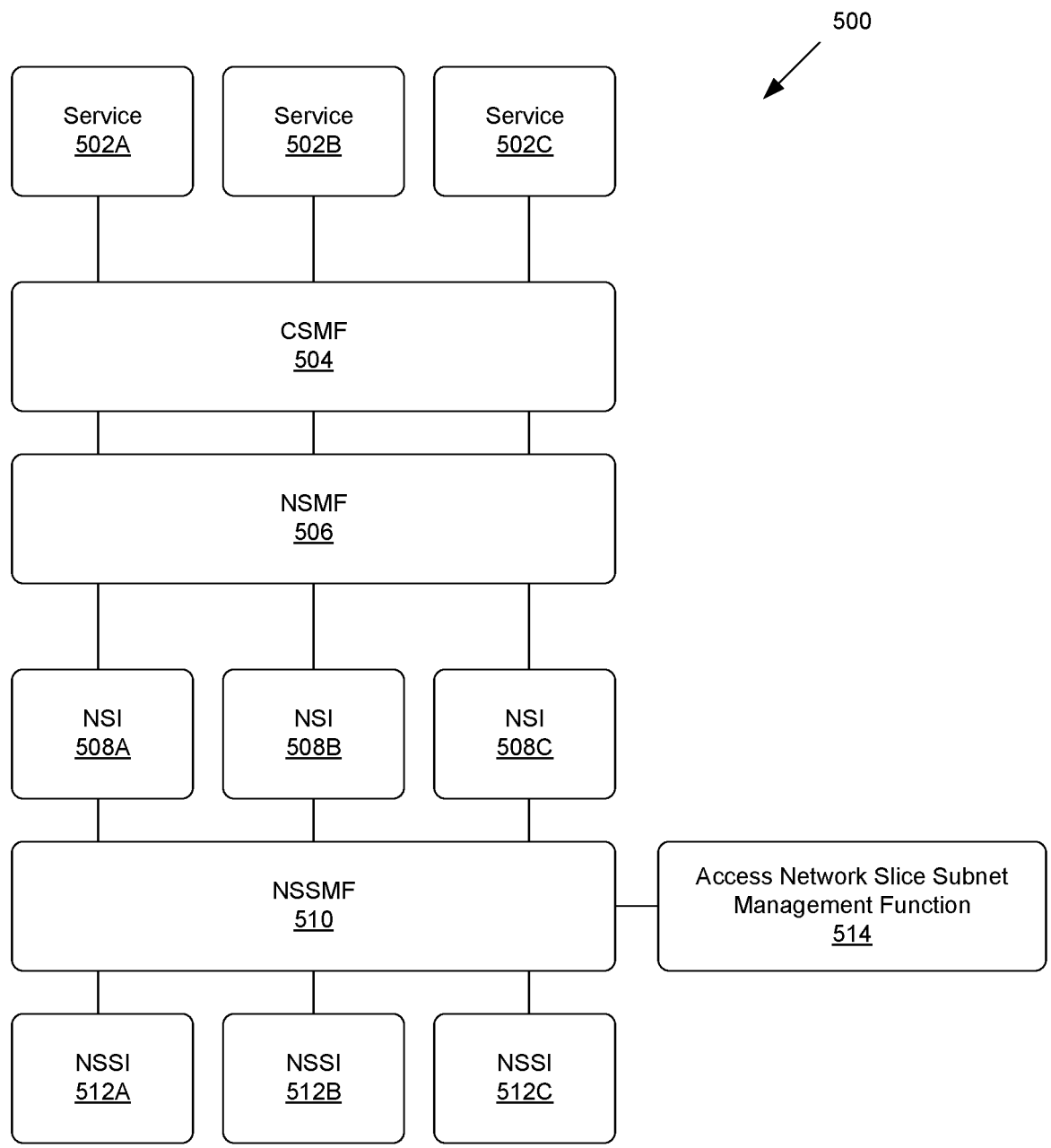
FIG. 5 depicts an example system architecture for network slice management.

FIG. 5 depicts an example system architecture 500 for network slice management. In the example of FIG. 5, different services 502 can be associated with different network slices. A communication service management function (CSMF) 504 in the core network 106 can assist with creating the different network slices, for example by determining and/or translating requirements, goals, or other attributes associated with the services 502 into target attributes for the network slices. For example, the services may be associated with SLAs, QoS levels, or other data that identifies latency goals, throughput goals, reliability goals, and/or other goals associated with the services. The CSMF 504 can translate such goals into attributes of corresponding network slices that may assist with meeting the goals.

Additionally, a network slice management function (NSMF) 506 in the core network 106 can create the network slices according to the target attributes determined by the CSMF 504. The NSMF 506 can be configured to manage and orchestrate the network slices, for instance over the life cycles of the network slices from creation to termination. For example, the NSMF 506 can create NSIs 508 for the services 502, where the NSIs 508 are distinct end-to-end network slices associated with each of the services 502. The NSMF 506 may also select network functions to be associated with the NSIs 508, determine or create NSSIs associated with the NSIs 508, and/or perform other operations to manage the NSIs 508.

The telecommunication network can also include at least one network slice subnet management function (NSSMF) 510. The NSSMF 510 can be configured to manage and orchestrate NSSIs 512 associated with the NSI 508. In some examples, the NSMF 506 may operate at a virtual layer, while the NSSMF 510 operates at a physical layer to implement the NSSIs 512. As discussed above, an end-to-end network slice can include portions in the core network, in the transport link 108, and/or in the access network. Accordingly, an NSI 508 associated with a service 502 can include a core network NSSI, a transport NSSI, and/or an access network NSSI. As shown in the example of FIG. 5, service 502A may be associated with NSI 508A and NSSI 512A, service 502B may be associated with NSI 508B and NSSI 512B, and service 502C may be associated with NSI 508C and NSSI 512C.

The NSSMF 510 can be configured to manage and orchestrate one or more types of NSSIs 512, such as core network NSSIs 512, transport NSSIs 512, and/or access network NSSIs 512. The NSSMF 510 can include, or interface with, an access network slice subnet management function 514 that manages access network NSSIs 512 or assists with management of access network NSSIs 512. In some examples, the NSSMF 510 can also include or interface with a core network slice subnet management function and/or a transport network slice subnet management function. The core network slice subnet management function can manage, or assist with managing core network NSSIs 512. The transport network slice subnet management function can manage, or assist with managing transport NSSIs 512.

As discussed above, the network access point 104 in the access network can include the slice manager 116. In some examples, the slice manager 116 may be an access network slice subnet management function 514 that can manage and orchestrate NSSIs 512 associated with the network access point 104. For instance, the slice manager 116 in the network access point 104 can be an access network slice subnet management function 514 that is, or communicates with, the NSSMF 510 that manages NSSIs 512 associated with the network access point 104. In other examples, the slice manager 116 may be an access network slice subnet management function 514 that coordinates with and/or assists a different NSSMF 510 in the core network 106. In still other examples, the slice manager 116 may be, or may assist, the NSMF 506 that manages NSIs 508 associated with the network access point 104.

Accordingly, the slice manager 116 can be an NSMF 506, NSSMF 510, or access network slice subnet management function 514 that can determine attributes of network slices 112 and bandwidth parts 114 associated with the network access point 104. For example, the slice manager 116 can determine frequencies allocated to network slices 112 and bandwidth parts 114, determine alignments between network slices 112 and bandwidth parts 114, determine numerologies 204 for bandwidth parts 114 associated with one or more network slices 112, and/or determine other attributes of network slices 112 and/or bandwidth parts 114.

Figure 6:
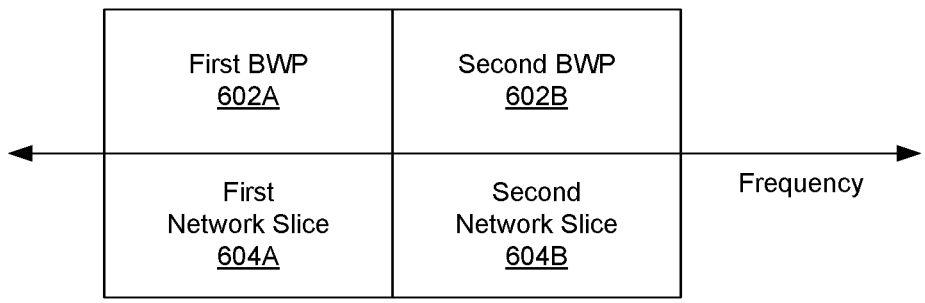
FIG. 6 shows a first example in which multiple bandwidth parts can support multiple network slices.

FIG. 6 shows a first example in which multiple bandwidth parts can support multiple network slices. In the example of FIG. 6, frequencies associated with a first bandwidth part 602A can align with frequencies associated with a first network slice 604A, while frequencies associated with a second bandwidth part 602B can align with frequencies associated with a second network slice 604B. Accordingly, as shown in FIG. 6, different network slices may align with different bandwidth parts. Additionally, because the numerologies 204 of different bandwidth parts can be set independently, different network slices may be associated with bandwidth parts that have the same or different numerologies 204, such as different subcarrier spacing values. Although FIG. 6 shows two bandwidth parts aligning with two network slices, in other examples three or more bandwidth parts can align with three or more network slices.

The UE 102 may use the first bandwidth part 602A in association with the first network slice 604A, use the second bandwidth part 602B in association with the second network slice 604, or use both the first bandwidth part 602A and the second bandwidth part 602B simultaneously in association with the first network slice 604A and the second network slice 604B. For example, the UE 102 can use a first numerology 204 associated with the first bandwidth part 602A to download data in association with the first network slice 604A, and simultaneously use a second numerology 204 associated with the second bandwidth part 602B to download data in association with the second network slice 604B.

As a non-limiting example, SLAs for the first network slice 604A and the second network slice 604B may indicate that the first network slice 604A is intended for eMBB services and that the second network slice 604B is intended for URLLC services. The slice manager 116 may allocate a first portion of spectrum to the first network slice 604A and a second portion of spectrum to the second network slice 604B. The slice manager 116 may also associate a set of resource blocks within the first portion of spectrum with the first bandwidth part 602A, and associate a set of resource blocks within the second portion of spectrum with the second bandwidth part 602B. The slice manager 116 can further set the numerologies 204 of the first bandwidth part 602A aligned with the first network slice 604A and of the second bandwidth part 602B aligned with the second network slice 604B. For instance, when SLA data indicates that lower latencies are prioritized more in the second network slice 604B (for URLLC services) than in the first network slice 604A (for eMBB services), the slice manager 116 may set the subcarrier spacing of the second bandwidth part 602B to a larger value than the subcarrier spacing of the first bandwidth part 602A, because higher subcarrier spacing values may lead to lower latencies in some cases.

Figure 7:
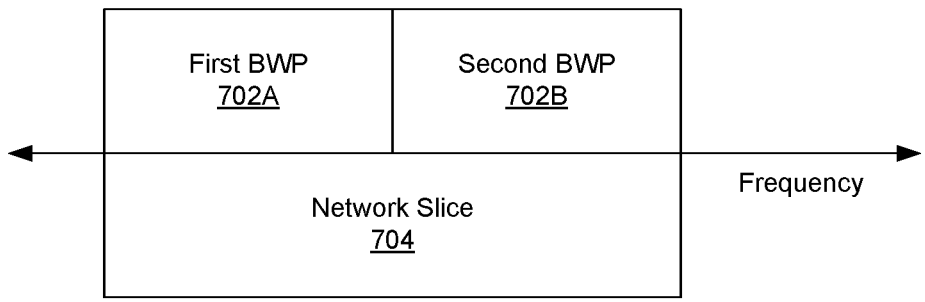
FIG. 7 shows a second example in which multiple bandwidth parts can support a single network slice.

FIG. 7 shows a second example in which multiple bandwidth parts can support a single network slice. In the example of FIG. 7, frequencies associated with a first bandwidth part 702A can align with a first portion of frequencies associated with a network slice 704, while frequencies associated with a second bandwidth part 702B can align with a second portion of frequencies associated with the same network slice 704. Although FIG. 7 shows two bandwidth parts aligning with a single network slice, in other examples three or more bandwidth parts can align with a single network slice.

Each of the bandwidth parts associated with the network slice 704 can have individually-set numerologies 204. For example, the first bandwidth part 702A and the second bandwidth part 702B may have the same numerology 204 or different numerologies 204. The UE 102 may use either the first bandwidth part 702A or the second bandwidth part 702B, or both the first bandwidth part 702A and the second bandwidth part 702B simultaneously, in association with the network slice 704.

In some examples, different bandwidth parts associated with the same network slice may be associated with different types of network traffic, such as traffic associated with different services. For example, although the network slice 704 may be associated with URLLC services overall, the first bandwidth part 702A may be associated with a first URLLC service and the second bandwidth part 702B may be associated with a second URLLC service. The slice manager 116 may set the numerologies 204 of the first bandwidth part 702A and the second bandwidth part 702B separately based on attributes or goals of the first URLLC service and the second URLLC service. Although both services may be URLLC services in this example, the first URLLC service may tolerate slightly higher latencies than the second URLLC service. Accordingly, the slice manager 116 may set the numerology 204 of the second bandwidth part 702B, associated with the less delay-tolerant second URLLC service, to a higher subcarrier spacing value than numerology 204 of the first bandwidth part 702A, because higher subcarrier spacing values may lead to lower latencies in some cases. Here, if the UE 102 is using the first URLLC service and the second URLLC service simultaneously via the same network slice 704, the UE 102 can use a first numerology 204 associated with the first bandwidth part 702A to download data associated with the first URLLC service, and simultaneously use a second numerology 204 associated with the second bandwidth part 702B to download data associated with the second URLLC service.

Figure 8:
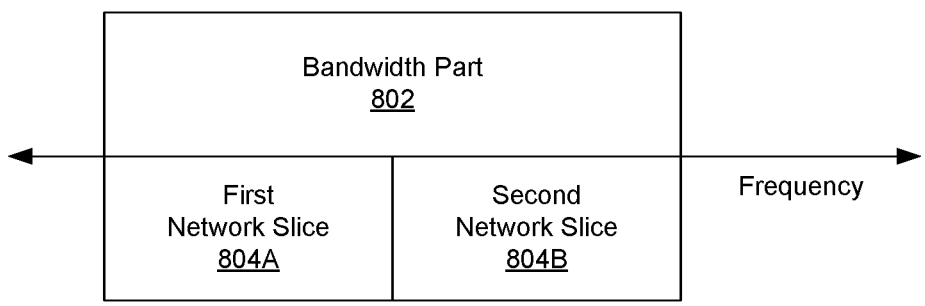
FIG. 8 shows a third example in which a single bandwidth part can support multiple network slices.

FIG. 8 shows a third example in which a single bandwidth part can support multiple network slices. In the example of FIG. 8, frequencies associated with a bandwidth part 802 can span portions of frequencies that have been allocated among multiple network slices, such as a first network slice 804A and a second network slice 804B. Although FIG. 8 shows a single bandwidth part 802 that aligns with two network slices, in other examples a single bandwidth part 802 may span frequencies allocated to three or more network slices.

The bandwidth part 802 shown in the example of FIG. 8 can have an associated numerology 204, as discussed above. Accordingly, because the bandwidth part 802 can span two or more network slices, the numerology 204 of the bandwidth part 802 can be used in association with any or all of those network slices.

In some examples, the bandwidth part 802 may associated with a particular service, such as an eMBB service, URLLC service, or MIoT service. However, the different network slices associated with the bandwidth part 802 may be associated with different customers, subscriber tiers, or other attributes. For example, a UE associated with a first customer may use the first network slice 804A to access a particular service associated with the bandwidth part 802, while another UE associated with a second customer may use the second network slice 804B to access the same service associated with the bandwidth part 802. Accordingly, although different UEs may connect to the network access point 104 using either the first network slice 804A or the second network slice 804B to access the service, the UEs may use the bandwidth part 802, and/or the numerology 204 associated with the bandwidth part 802, when downloading data associated with the service.

Figure 9:
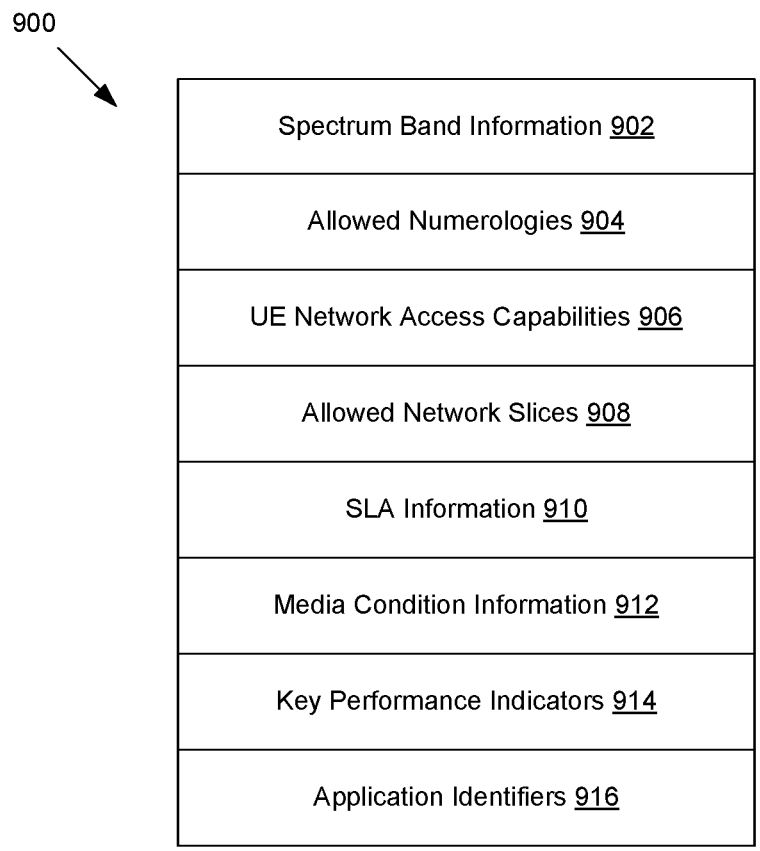
FIG. 9 shows an example of types of input factors that a slice manager can consider when managing one or more network slices and/or bandwidth parts associated with the network slices.

FIG. 9 shows a non-limiting example 900 of types of input factors that the slice manager 116 can consider when managing one or more network slices 112 and/or bandwidth parts associated with the network slices 112. The input factors can include one or more of: spectrum band information 902, allowed numerologies 904, UE network access capabilities 906, allowed network slices 908, SLA information 910, media condition information 912, key performance indicators (KPIs) 914, and application identifiers 916.

The spectrum band information 902 can include information about which spectrum bands the network access point 104 supports. For example, the spectrum band information 902 may indicate that the network access point 104 supports the n71 low band and the n41 mid-band. In this example, the spectrum band information 902 can indicate that the slice manager 116 can allocate portions of spectrum from the n71 band and/or the n41 band among network slices 112 and/or bandwidth parts 114 associated with the network access point 104. Because different network access points may support different bands, the spectrum band information 902 can indicate to the slice manager 116 which bands are supported by a particular network access point.

The spectrum band information 902 may, in some examples, also indicate a current allocation of radio resources or other spectrum resources to each network slice 112 and/or to each bandwidth part 114. For example, the spectrum band information 902 may identify specific portions of radio resources or other spectrum resources currently allocated to each network slice 112 and/or each bandwidth part 114, numerologies 204 currently used for each bandwidth part 114, and/or other information about current resource allocations. The slice manager 116 may use such information to determine how resources of the network access point 104 can be adjusted with respect to one or more network slices 112 and/or one or more bandwidth parts 114.

The allowed numerologies 904 can indicate which numerologies 204 are permitted for each band or portion of spectrum supported by the network access point 104 that may be associated with one or more network slices 112 and/or bandwidth parts 114. For example, the allowed numerologies 904 may indicate that the subcarrier spacing 302 for a bandwidth part 114 in a low band is permitted to be 15 kHz, 30 kHz, or 60 kHz, that the subcarrier spacing 302 for a bandwidth part 114 in a mid-band is permitted to be 30 kHz or 60 kHz, and that the subcarrier spacing 302 for a bandwidth part 114 in a high band is permitted to be 60 kHz or 120 kHz.

The UE network access capabilities 906 can indicate radio capabilities and/or other network access capabilities of the UE 102. For instance, the UE network access capabilities 906 may indicate which spectrum bands the UE 102 supports, which numerologies 204 the UE 102 supports, and/or other information about network access capabilities of the UE 102. In some examples, an element of the core network 106, such as an AMF, can provide the network access point 104 with information about network access capabilities of the UE 102. For instance, when the UE 102 sends a protocol data unit (PDU) service request, or other type of service request, to the network access point 104, the network access point 104 can forward the service request to an AMF. The AMF can look up information about the radio capabilities and/or other network access capabilities of the UE 102 in response to the service request, and return the UE network access capabilities 906 to the network access point 104 In other examples, the UE 102 may transmit information to the network access point 104 that indicates network access capabilities of the UE 102.

The allowed network slices 908 can identify one or more network slices 112 that the UE 102 is permitted to access. For example, some network slices 112 may be reserved for certain subscriber types or tiers, users associated with certain customers, and/or other groups. In some examples, an element of the core network 106, such as an AMF, can provide the network access point 104 with information about which network slices 112 the UE 102 is permitted to use. For instance, when the UE 102 submits a service request to the network access point 104, the network access point 104 can forward the service request to the AMF, the AMF can determine from subscriber data or other data which NSSAIs the UE 102 is allowed to access, and the AMF can provide a list of the allowed NSSAIs to the network access point 104.

The SLA information 910 can indicate SLA requirements or goals for network slices 112. An SLA for a network slice 112 may define types of services to be associated with the network slice 112, target latency measurements for the network slice 112, target throughput measurements for the network slice 112, reliability goals for the network slice 112, and/or other attributes of the network slice 112. In some examples, the SLA information 910 for a network slice 112 may also indicate how many bandwidth parts 114 can be associated with the network slice 112. For instance, the SLA information 910 may indicate a predefined number of bandwidth parts 114 for the network slice 112, a minimum number of bandwidth parts 114 for the network slice 112, or a maximum number of bandwidth parts 114 for the network slice 112.

The media condition information 912 can be signal strength information and other information associated with a connection medium provided by the UE 102 and/or other UEs connected to the network access point 104. In some examples, the media condition information 912 can indicate radio conditions associated with wireless connections with respect to one or more UEs. In other examples, the media condition information 912 can indicate conditions associated with wired connections with respect to one or more UEs, such as signal strengths or other conditions over coaxial cable or twisted pair wires. The media condition information 912 reported by UEs 102 may be associated with one or more network slices 112 and/or one or more bandwidth parts 114. For example, the UE 102 can provide signal strength measurements associated with one or more network slices 112 and/or one or more bandwidth parts 114. If a particular portion of spectrum is allocated to a network slice 112 and/or bandwidth part 114, but the media condition information 912 indicates that UEs have experienced low signal strengths with respect to that particular portion of spectrum, the slice manager 116 may determine to re-allocate available spectrum among network slices 112 and/or bandwidth parts 114 to improve signal strengths experienced by UEs with respect to the network slice 112 and/or bandwidth part 114.

The KPIs 914 can include other performance indicators with respect to one or more network slices 112 and/or one or more bandwidth parts 114. For example, the KPIs 914 can include bandwidth measurements, latency measurements, throughput measurements, load metrics, and/or any other performance metric associated with network slices 112 and/or bandwidth parts 114.

As a first example, the KPIs 914 can include latency information associated with a connection between the network access point 104 and the UE 102, and/or end-to-end latency information regarding end-to-end transmissions associated with a network slice 112. For example, the UE 102 may provide a round-trip time measured by the UE 102 in association with a particular combination of a network slice 112 and a bandwidth part 114, which may be indicative of an end-to-end latency associated with a particular network slice 112. As another example, a UE report may indicate a latency value associated with an air interface between the UE 102 and the network access point 104, and the slice manager 116 may separately determine latencies associated with processing at the network access point 104 at one or more protocol layers, latencies of transmissions via the transport link 108, and/or latencies due to processing or transmission in the core network 106. Accordingly, the slice manager 116 can combine air interface latency information, network access point latency information, transport link latency information, and/or core network latency information associated with a particular network slice 112 and/or bandwidth part 114 to determine an end-to-end latency associated with that network slice 112 and/or bandwidth part 114.

As a second example, the KPIs 914 can include loading information, such as information about capacity and utilization of the network slices 112 in the RAN, the transport link 108, and/or the core network 106. For example, based on current radio or spectrum resources allocated to each network slice 112 by the network access point 104, access network loading information may indicate a maximum number of UEs that can be connected via each network slice 112. The access network loading information can also indicate a current number of UEs that are connected to each network slice 112. The access network loading information may also indicate a utilization level for each network slice 112, based on the current number of UEs connected via each network slice 112 relative to the maximum capacity for those network slices 112.

As a third example, the KPIs 914 can include user experience metrics, such as latency measurements, throughput measurements, reliability measurements, and/or other metrics that may be impact the experiences of users of UEs connected to the network access point 104 with respect to particular network slices 112 and/or bandwidth parts 114. In some examples, the user experience metrics can be derived from UE reports submitted by UEs. In other examples, the user experience metrics can also, or alternately, be based on measurements performed by network access point 104 with respect to particular network slices 112 and/or bandwidth parts 114.

The application identifiers 916 can be received from the UE 102, and may indicate particular services or applications the UE 102 is using or requesting in association with network slices 112 and/or bandwidth parts 114. For example, an application identifier 916 may be included in a UE report or in a service request sent by the UE 102. In some examples, the UE 102 can also send additional application-level or service-level information along with, or in addition to, an application identifier 916, such as an operating system identifier (OS ID), data network name (DNN), and/or other information. In some examples, an application identifier 916, OS ID, DNN, and/or other information may correspond to a particular service attribute or goal, such as a latency, throughput, or reliability goal.

In some examples, Quality of Experience (QoE) goals, or other goals, associated with an application identifier 916 may be different from goals in an SLA for a network slice 112. For instance, although SLA information 910 may indicate that a network slice 112 is for URLLC services and/or indicate a particular maximum latency goal for the network slice 112, an application identifier 916 may indicate that the UE 102 is executing a particular application that has an even lower maximum latency goal. As an example, the application identifier 916 may indicate that the UE 102 is executing, via a combination of a network slice 112 and a bandwidth part 114, a cloud gaming application that operates best at latencies under 15 ms. If the SLA information 910 for the network slice 112 identifies a maximum latency of 30 ms, the slice manager 116 may nevertheless adjust subcarrier spacing 302 or other aspects of the numerology 204 for the bandwidth part 114 in an attempt to achieve latencies that are under the 15 ms goal associated with the application identifier 916, rather than the higher 30 ms goal that would otherwise be associated with the network slice 112.

In other examples, the slice manager 116 can use application identifiers 916 for admission control, loading control, or other radio resource management functions. For example, if the UE 102 sends a first PDU session request with an application identifier 916 for a voice call application and a second PDU session request with an application identifier 916 for a gaming application, the slice manager 116 may determine that the UE 102 should be admitted to a first network slice and bandwidth part combination for traffic of the voice call application and to a second network slice and bandwidth part combination for traffic of the gaming application.

Figure 10:
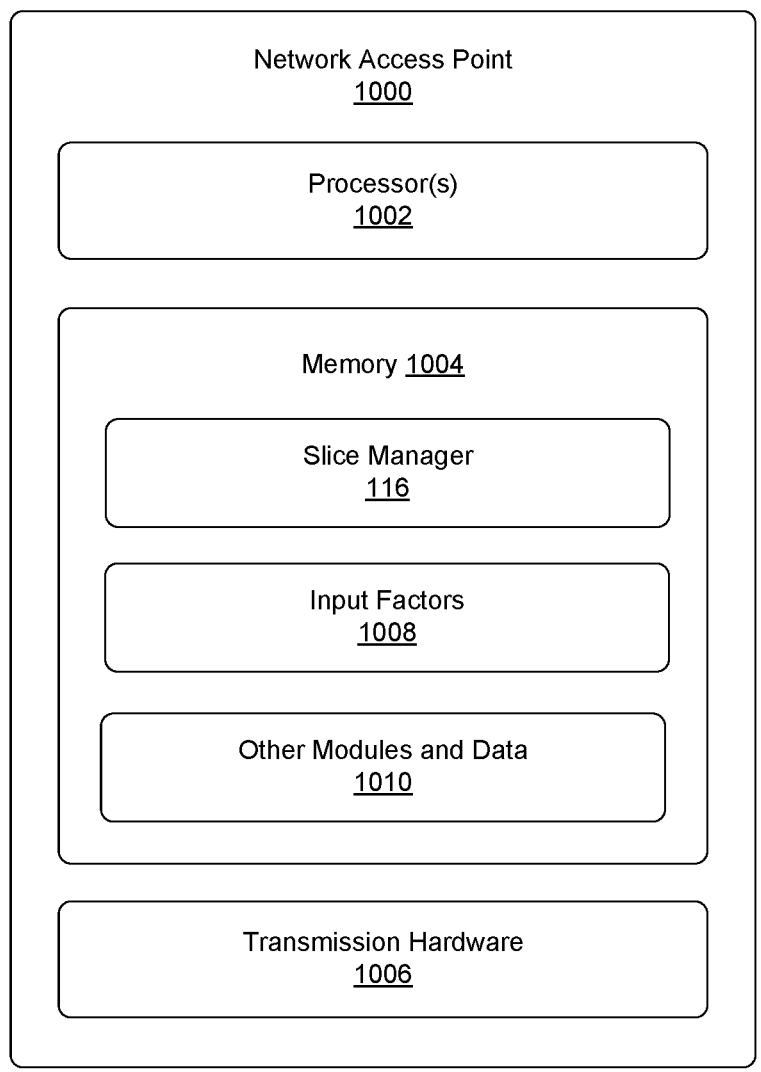
FIG. 10 shows an example system architecture for a network access point.

FIG. 10 shows an example system architecture for a network access point 1000, in accordance with various examples. In some examples, the network access point 1000 can be a 5G base station, such as a gNB. In other examples, the network access point 1000 can be compatible with another type or generation of access technology. As shown, the network access point 1000 can include processor(s) 1002, memory 1004, and transmission hardware 1006.

The processor(s) 1002 may be a central processing unit (CPU) or any other type of processing unit. Each of the one or more processor(s) 1002 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1002 may also be responsible for executing all computer-executable instructions and/or computer applications stored in the memory 1004.

In various examples, the memory 1004 can include system memory, which may be volatile (such as RAM), non-volatile (such as ROM, flash memory, etc.) or some combination of the two. The memory 1004 can also include additional data storage devices (removable and/or non-removable) such as, for example, magnetic disks, optical disks, or tape. Memory 1004 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the network access point 1000. Any such non-transitory computer-readable media may be part of the network access point 1000.

The memory 1004 can store computer-readable instructions and/or other data associated with operations of the network access point 1000. For example, the memory 1004 can store data for the slice manager 116, including computer-executable instructions for the slice manager 116, data associated with input factors 1008 considered by the slice manager 116, such as the input factors shown in FIG. 9, and/or any other data associated with the slice manager 116. As described herein, the slice manager 116 at the network access point 1000 can use the input factors 1008 to manage network slices 112 and/or bandwidth parts 114 associated with the network access point 1000.

The memory 1004 can further store other modules and data 1010, which can be utilized by the network access point 1000 to perform or enable performing any action taken by the network access point 1000. The modules and data 1010 can include a platform, operating system, firmware, and/or applications, and data utilized by the platform, operating system, firmware, and/or applications.

The transmission hardware 1006 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, other network access points, elements of the core network 106, and/or other network elements, and can transmit data over such connections. For example, the transmission hardware 1006 can establish one or more connections with the UE 102 over air interfaces and/or wired connections, and a connection with the core network 106 via the transport link 108. In some examples, the transmission hardware 1006 can also support transmissions using one or more radio access technologies, such as 5G NR, as discussed above.

The transmission hardware 1006 may also support one or more spectrum bands, such as low bands, mid-bands, and/or high bands. The transmission hardware 1006 may also support one or more access technologies, such as radio access technologies, wired access technologies over coaxial cable, twisted pair wire, or other wired connections, and/or other access technologies. The transmission hardware 1006 may be configured to allocate different portions of the one or more spectrum bands to different network slices 112 and/or bandwidth parts 114, based on determinations by the slice manager 116 described herein. For example, the slice manager 116 can cause the transmission hardware 1006 to re-allocate or otherwise adjust radio resources and/or other spectrum resources of the network access point 1000 associated with combinations of one or more network slices 112 and one or more bandwidth parts 114. As another example, the slice manager 116 can cause the transmission hardware 1006 to set or adjust numerologies 204 of one or more bandwidth parts 114 that align with one or more network slices 112.

Figure 11:
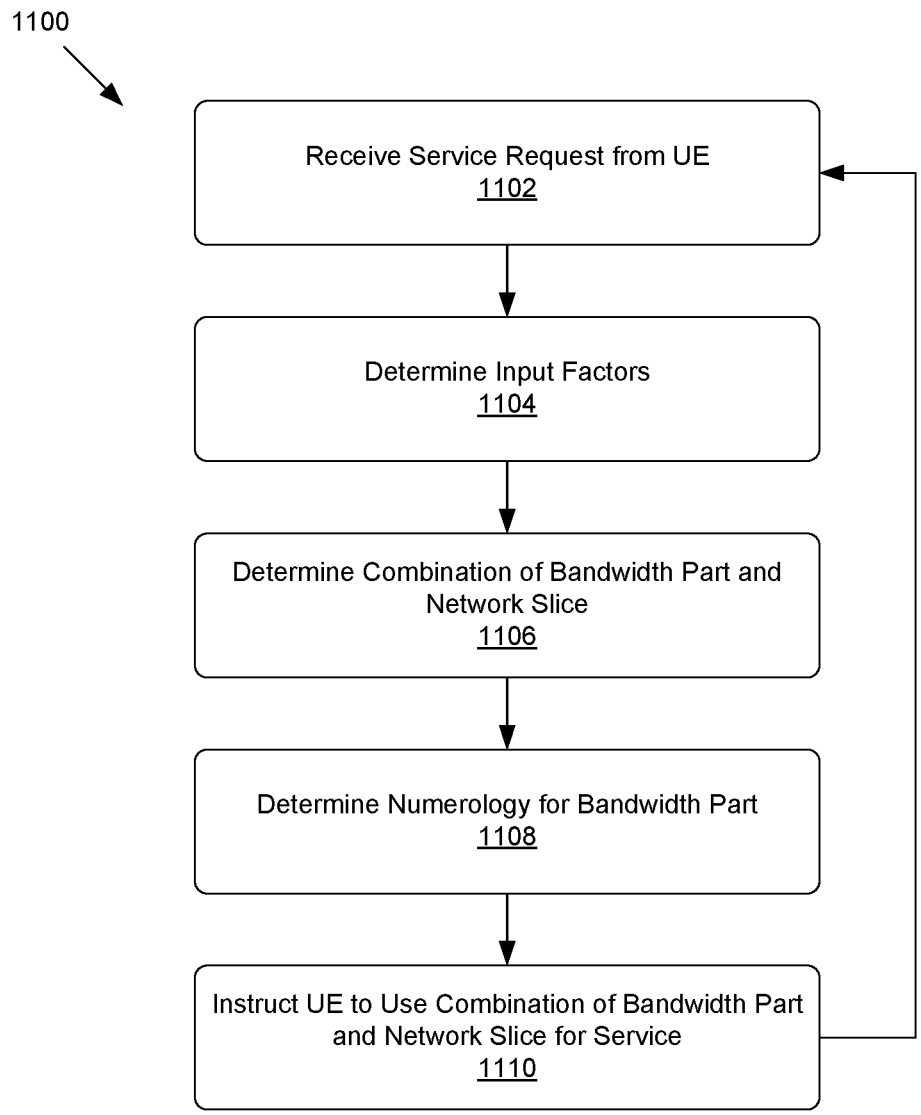
FIG. 11 shows a flowchart of an example method that a slice manager at a network access point can use to manage combinations of network slices and bandwidth parts.

FIG. 11 shows a flowchart of an example method 1100 that the slice manager 116 at the network access point 104 can use to manage combinations of network slices 112 and bandwidth parts 114. At block 1102, the network access point 104 can receive a service request from the UE 102. For example, the UE 102 can send a PDU service request to the network access point 104 via an RRC message. In some examples, the service request can include or otherwise indicate and application identifier 916 associated with the service request.

At block 1104, the slice manager 116 can determine one or more input factors associated with the UE 102. For example, the slice manager 116 may use spectrum band information 902 to determine which bands the network access point 104 supports, use allowed numerologies 904 to determine which numerologies 204 can be used with the supported bands, use UE network access capabilities 906 and allowed network slices 908 to determine potential combinations of network slices 112 and bandwidth parts 114 that could be assigned to the UE 102, and/or determine or use other input factors discussed above with respect to FIG. 9.

In some examples, the network access point 104 can forward the service request received from the UE 102 at block 1102 to an AMF or other network elements in the core network 106. Such elements of the core network 106 may look up information associated with the UE 102, such as a user account, subscription type, or other data, and return corresponding information to the network access point 104. As an example, an AMF may use a registration status of the UE 102 and/or location data associated with the UE 102 or the network access point 104 to select one or more allowed network slices for the UE 102, in coordination with an NSSF and/or a UDM. The AMF may accordingly return information to the network access point 104 that includes UE network access capabilities 906 and/or allowed network slices 908, such as an identification of a particular network slice 112 selected for the UE 102 by the AMF and/or NSSF. The slice manager 116 can use such information received from the core network, as well as information received from the UE 102 in the service request or in other messages, and/or information determined by the slice manager 116 or other elements of the network access point 104, as input factors at block 1104.

At block 1106, the slice manager 116 can use the input factors to determine a combination of a bandwidth part 114 and a network slice 112 for the UE 102 in response to the service request. In some examples, the core network 106 may have indicated a set of one or more network slices 112 that the UE 102 is permitted to access. The slice manager 116 may select one of those network slices 112 for the UE 102, such as a network slice 112 associated with an SLA associated with the service or a network slice 112 that has attributes that align with goals for the service. In other examples, the core network 106 may have identified a particular network slice 112 for the UE 102 in response to the service request, and the slice manager 116 can thus select the network slice 112 identified by the core network 106. The slice manager 116 can also create or select a bandwidth part 114 associated with the selected network slice 112, which the slice manager 116 can assign to the UE 102 along with the network slice 112.

At block 1108, the slice manager 116 can determine or adjust a numerology 204 for the selected bandwidth part 114. For example, based on an application identifier 916 or any other input factors, the slice manager 116 can select a numerology 204 to use with the selected bandwidth part 114. In some examples, the slice manager 116 may select a numerology 204 for the bandwidth part 114 that may assist in providing latencies, throughput, or reliability measurements that meet one or more QoE goals associated with the application identifier 916.

At block 1110, the slice manager 116 can instruct the UE 102 to use the selected combination of the network slice 112 and the bandwidth part 114. For example, the slice manager 116 can send an RRC connection reconfiguration message to the UE 102 that indicates to the UE 102 that the UE 102 should use the selected network slice 112 and the selected bandwidth part 114 for traffic of the service associated with the service request. The instruction sent at block 1110 can also identify the numerology 204 selected by the slice manager 116 for the bandwidth part 114.

In some examples, the operations shown in the example of FIG. 11 can be repeated for different service requests sent by the UE 102. For example, if the network access point 104 receives multiple service requests from the same UE 102 at block 1102, the slice manager 116 can determine a combination of a network slice 112 and a bandwidth part 114 for each different service request according to the operations shown in FIG. 11. Similarly, the slice manager 116 may perform the operations shown in FIG. 11 in association with a first service request from the UE 102, and then subsequently perform the operations shown in FIG. 11 in association with a later second service request received from the UE 102 while the UE 102 is still using a first service associated with the first service request.

For instance, if the UE 102 submits service requests for two different services simultaneously or at different times, the slice manager 116 can determine a first combination of a network slice 112 and a bandwidth part 114 for a first service, and also determine a second combination of a network slice 112 and a bandwidth part 114 for a second service. The UE 102 can then use the first combination and the second combination simultaneously for traffic of the respective services. In some examples, the first combination and the second combination may have entirely different network slices 112 and bandwidth parts 114, for instance as shown in the example of FIG. 6. However, in other examples, the first combination and the second combination may have a common network slice 112 and different bandwidth parts 114, for instance as shown in the example of FIG. 7. In still other examples, the first combination and the second combination may have a common bandwidth part 114 and different network slices 112, for instance as shown in the example of FIG. 8.

As a non-limiting example, at a first point in time the UE 102 may submit a first service request associated with an eMBB service. The UE 102 may be located at a position that is covered by mid-band spectrum of the network access point 104, but is not covered by a high band of the network access point 104. Input factors, such as allowed network slices 908, may indicate that the UE 102 can be admitted to a first network slice 112 associated with the mid-band spectrum for the eMBB service.

The slice manager 116 can create and/or select a first bandwidth part 114 that aligns with at least a portion of the first network slice 112, and can select a first numerology 204 for the first bandwidth part 114. For example, the slice manager 116 may select the first numerology 204 based on an application identifier 916 of the eMBB service, based on KPIs 914 associated with the first network slice 112 or the first bandwidth part 114, based on SLA information 910 for the first network slice 112, based on UE network access capabilities 906, based on allowed numerologies 904, and/or based on any other input factors.

Accordingly, the slice manager 116 can select a first combination of the first network slice 112 and the first bandwidth part 114, associated with the first numerology 204, in response to the first service request. The slice manager 116 can thus instruct the UE 102 to use the selected first combination in response to the first service request.

At a second point in time, the UE 102 may submit a second service request associated with a URLLC service, such as a cloud gaming service. The UE 102 may still be using the eMBB service associated with the first service request, via the first combination of the first network slice 112 and the first bandwidth part 114, when the UE 102 sends the second service request to the network access point 104. At the second point in time, the UE 102 may still be located at a position that is covered by the mid-band spectrum of the network access point 104, and is not covered by the high band spectrum of the network access point 104. Input factors, such as allowed network slices 908, may indicate that the UE 102 can be admitted to a second network slice 112 associated with the mid-band spectrum for the URLLC service.

The slice manager 116 can create and/or select a second bandwidth part 114 that aligns with at least a portion of the second network slice 112, and can select a second numerology 204 for the second bandwidth part 114. For example, the slice manager 116 may select the second numerology 204 based on an application identifier 916 of the URLLC service, based on KPIs 914 associated with the second network slice 112 or the second bandwidth part 114, based on SLA information 910 for the second network slice 112, based on UE network access capabilities 906, based on allowed numerologies 904, and/or based on any other input factors.

In some examples, the second numerology 204 selected for the second bandwidth part 114 may be different from the first numerology 204 selected for the second bandwidth part 114. For example, although both the first network slice 112 and the second network slice 112 may be in the same mid-band supported by the network access point 104, such as the n41 band, the slice manager 116 may determine to use a larger subcarrier spacing value for the second bandwidth part 114 than the first bandwidth part 114. For instance, because the first bandwidth part 114 is being used for a more delay-tolerant eMBB service, and the second bandwidth part 114 is being used for a less delay-tolerant cloud gaming URLLC service, the slice manager 116 may determine to use a 30 kHz subcarrier spacing for the first bandwidth part 114 and use 60 kHz subcarrier spacing for the second bandwidth part 114 because the 60 kHz subcarrier spacing may provide lower latencies to the cloud gaming URLLC service.

Accordingly, the slice manager 116 can select a second combination of the second network slice 112 and the second bandwidth part 114, associated with the second numerology 204, in response to the second service request. The slice manager 116 can thus instruct the UE 102 to use the selected second combination in response to the second service request. The slice manager 116 may therefore cause the UE 102 to simultaneously use the first combination for the first service and the second combination for the second service, such that the UE 102 can use two active bandwidth parts simultaneously.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by a network access point of a telecommunication network and from a user equipment (UE), a service request associated with a service;
   determining, by the network access point, a combination of a network slice associated with the network access point and a bandwidth part associated with the network slice;
   sending, by the network access point and to the UE, a message instructing the UE to use the network slice and the bandwidth part for network traffic associated with the service;
   receiving, by the network access point and from the UE, a second service request associated with a second service;
   determining, by the network access point, a second combination of a second network slice associated with the network access point and a second bandwidth part associated with the second network slice; and
   sending, by the network access point and to the UE, a second message instructing the UE to use the second network slice and the second bandwidth part for second network traffic associated with the second service,
   wherein:
      the message and the second message cause the UE to simultaneously use the bandwidth part and the second bandwidth part; and
      one or more of: the network slice and the second network slice are different network slices, and the bandwidth part and the second bandwidth part are different bandwidth parts, or the network slice and the second network slice are a same network slice, and the bandwidth part and the second bandwidth part are the different bandwidth parts.

2. The method of claim 1, further comprising determining, by the network access point, a numerology for the bandwidth part associated with the network slice.

3. The method of claim 2, wherein the network access point determines the numerology for the bandwidth part based at least on a goal associated with the network slice or the service.

4. The method of claim 3, wherein the goal is a latency goal, a throughput goal, or a reliability goal.

5. The method of claim 1, wherein the second message causes the UE to simultaneously use:
the combination of the network slice and the bandwidth part for the network traffic of the service; and
the second combination of the second network slice and the second bandwidth part for the second network traffic of the second service.

6. The method of claim 1, further comprising determining, by the network access point, a first numerology for the bandwidth part and a second numerology for the second bandwidth part.

7. The method of claim 1, wherein the network access point determines the combination of the network slice and the bandwidth part based on one or more input factors that include at least one of: spectrum band information, allowed numerologies, UE network access capabilities, allowed network slices, Service Level Agreement (SLA) information, media condition information, key performance indicators, or application identifiers.

8. A network access point, comprising:
one or more processors;
memory storing computer-executable instructions that, when executed by the one or more processors, cause the one or more processors to perform operations comprising:
receiving, from a user equipment (UE), a service request associated with a service;
determining a combination of a network slice associated with the network access point and a bandwidth part associated with the network slice;
sending, to the UE, a message instructing the UE to use the network slice and the bandwidth part for network traffic associated with the service;
receiving, from the UE, a second service request associated with a second service;
determining a second combination of a second network slice associated with the network access point and a second bandwidth part associated with the second network slice; and
sending, to the UE, a second message instructing the UE to use the second network slice and the second bandwidth part for second network traffic associated with the second service,
wherein:
the message and the second message cause the UE to simultaneously use the bandwidth part and the second bandwidth part; and
one or more of: the network slice and the second network slice are different network slices, and the bandwidth part and the second bandwidth part are different bandwidth parts, or the network slice and the second network slice are a same network slice, and the bandwidth part and the second bandwidth part are the different bandwidth parts.

9. The network access point of claim 8, wherein the operations further comprise determining a numerology for the bandwidth part associated with the network slice.

10. The network access point of claim 9, wherein:
the network access point determines the numerology for the bandwidth part based at least on a goal associated with the network slice or the service; and
the goal is a latency goal, a throughput goal, or a reliability goal.

11. The network access point of claim 8, wherein the second message causes the UE to simultaneously use:
the combination of the network slice and the bandwidth part for the network traffic of the service; and
the second combination of the second network slice and the second bandwidth part for the second network traffic of the second service.

12. The network access point of claim 8 wherein the operations further comprise determining a first numerology for the bandwidth part and a second numerology for the second bandwidth part.

13. The network access point of claim 8, wherein the combination of the network slice and the bandwidth part is determined based on one or more input factors that include at least one of: spectrum band information, allowed numerologies, UE network access capabilities, allowed network slices, Service Level Agreement (SLA) information, media condition information, key performance indicators, or application identifiers.

14. One or more non-transitory computer-readable media storing computer-executable instructions that, when executed by one or more processors of a network access point, cause the one or more processors to perform operations comprising:
receiving, from a user equipment (UE), a service request associated with a service;
determining a combination of a network slice associated with the network access point and a bandwidth part associated with the network slice;
sending, to the UE, a message instructing the UE to use the network slice and the bandwidth part for network traffic associated with the service;
receiving, from the UE, a second service request associated with a second service;
determining a second combination of a second network slice associated with the network access point and a second bandwidth part associated with the second network slice; and
sending, to the UE, a second message instructing the UE to use the second network slice and the second bandwidth part for second network traffic associated with the second service,
wherein:
the message and the second message cause the UE to simultaneously use the bandwidth part and the second bandwidth part; and one or more of:
the network slice and the second network slice are different network slices, and the bandwidth part and the second bandwidth part are different bandwidth parts, or the network slice and the second network slice are a same network slice, and the bandwidth part and the second bandwidth part are the different bandwidth parts.

15. The one or more non-transitory computer-readable media of claim 14, wherein:
the operations further comprise determining a numerology for the bandwidth part associated with the network slice; and
the numerology for the bandwidth part is determined based at least on a goal associated with the network slice or the service.

16. The one or more non-transitory computer-readable media of claim 15, wherein the goal is a latency goal, a throughput goal, or a reliability goal.

17. The one or more non-transitory computer-readable media of claim 14, wherein the operations further comprise determining a first numerology for the bandwidth part and a second numerology for the second bandwidth part.

18. The one or more non-transitory computer-readable media of claim 14, wherein the combination of the network slice and the bandwidth part is determined based on one or more input factors that include at least one of: spectrum band information, allowed numerologies, UE network access capabilities, allowed network slices, Service Level Agreement (SLA) information, media condition information, key performance indicators, or application identifiers.

* * * * *